US006480117B1

(12) United States Patent
Flick

(10) Patent No.: US 6,480,117 B1
(45) Date of Patent: *Nov. 12, 2002

(54) VEHICLE CONTROL SYSTEM INCLUDING TOKEN VERIFICATION AND CODE RESET FEATURES FOR ELECTRICALLY CONNECTED TOKEN

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,536

(22) Filed: Apr. 20, 2000

Related U.S. Application Data

(63) Continuation-in-part of application No. 09/034,964, filed on Mar. 4, 1998, now Pat. No. 6,188,326, which is a continuation-in-part of application No. 08/622,515, filed on Mar. 25, 1996, now Pat. No. 6,140,938, which is a continuation-in-part of application No. 08/423,570, filed on Apr. 14, 1995, now Pat. No. 5,654,688.

(51) Int. Cl.[7] ............................................... G08C 19/00
(52) U.S. Cl. ........................... 340/825.69; 340/825.72; 340/5.2; 340/5.21; 340/5.8; 341/176
(58) Field of Search ....................... 340/825.69, 825.72, 340/5.2, 5.21, 5.8; 341/176

(56) References Cited

U.S. PATENT DOCUMENTS

| 4,383,242 A | 5/1983 | Sassover et al. |
| 4,881,148 A | 11/1989 | Lambropoulos et al. |
| 4,928,098 A | 5/1990 | Dannhaeuser |
| 4,975,969 A | 12/1990 | Tal |
| 5,049,867 A | 9/1991 | Stouffer |
| 5,055,701 A | 10/1991 | Takeuchi |
| 5,099,226 A | 3/1992 | Andrews |
| 5,103,221 A | 4/1992 | Memmola |
| 5,146,215 A | 9/1992 | Drori |
| 5,243,322 A | 9/1993 | Thompson et al. |
| 5,252,966 A | 10/1993 | Lambropoulos et al. |
| 5,278,547 A | 1/1994 | Suman et al. |
| 5,365,225 A | 11/1994 | Bachhuber |
| 5,406,274 A | 4/1995 | Lambropoulos et al. |
| 5,412,379 A | 5/1995 | Waraksa et al. |
| 5,442,341 A | 8/1995 | Lambropoulos |
| 5,469,506 A | 11/1995 | Berson et al. |
| 5,513,105 A | 4/1996 | Krones |
| 5,563,579 A | 10/1996 | Carter |
| 5,654,688 A | 8/1997 | Allen et al. |
| 5,682,133 A | 10/1997 | Johnson et al. |
| 6,188,326 B1 * | 2/2001 | Flick ..................... 340/825.69 |

FOREIGN PATENT DOCUMENTS

| DE | 43 25 221 A1 | 7/1993 |
| EP | 0 535 555 A1 | 9/1992 |
| WO | 91/15645 | 10/1991 |

* cited by examiner

Primary Examiner—Michael Horabik
Assistant Examiner—Yves Dalencourt
(74) Attorney, Agent, or Firm—Allen, Dyer, Doppelt, Milbrath & Gilchrist, P.A.

(57) ABSTRACT

A control system for a vehicle includes a controller for learning a unique code of a token to define a learned token capable of causing performance of a function associated with the vehicle, for example. The controller performs remote token verification to generate an indication relating to whether a new uniquely coded token has been learned by the controller. The control system is advantageously used for a vehicle security system also enabling starting of the vehicle. The token may also include at least one first electrical conductor for electrically connecting to at least one second electrical conductor included in a token reader. In one embodiment, the token verification is based upon the controller being recently entered into the token learning mode. According to another embodiment, the token verification is based upon a number of learned tokens, a change in that number, or a change in a learned code of a token. The indication may be provided at the vehicle or remote therefrom by any of a light, a visual display, a vibration transducer, a speech message generator, and an audible signal generator, for example.

86 Claims, 10 Drawing Sheets

VEHICLE CONTROL SYSTEM INCLUDING TOKEN VERIFICATION AND CODE RESET FEATURES FOR ELECTRICALLY CONNECTED TOKEN

RELATED APPLICATION

The present application is a continuation-in-part application of U.S. patent application, Ser. No. 09/034,964, filed Mar. 4, 1998, now U.S. Pat. No. 6,188,326 which, in turn, is a continuation-in-part application of U.S. patent application No. 08/622,515, filed Mar. 25, 1996, now U.S. Pat. No. 6,140,938 which, in turn, is a continuation-in-part Ser. No. 08/423,570 filed Apr. 14, 1995 of U.S. Pat. No. 5,654,688.

FIELD OF THE INVENTION

The present invention relates to the field of control systems, and more particularly, to a control system for a vehicle.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the vehicle security system or provide other remote control features from a predetermined range away from the vehicle.

Other vehicle security systems may be associated with the ignition of the vehicle. More particularly, one type of conventional vehicle security system includes a passive transponder either carried by the keychain or embedded in the ignition key. When the transponder is positioned adjacent the ignition switch, the transponder is inductively powered and transmits a uniquely coded signal to a receiver in the vehicle. When a properly coded transponder is detected, the vehicle engine may be allowed to start, for example. In other words, an ignition or fuel cutoff is normally operative to prevent the engine from starting or running, unless the proper transponder is sensed. Accordingly, vehicle security is increased.

The security system may have multiple transponders capable of disabling the ignition or fuel cutoff to thereby permit operation of the vehicle. These uniquely coded transponders may be added or deleted from the vehicle controller. Unfortunately, the owner of the vehicle may not know that a transponder has been added without authorization.

U.S. Pat. No. 5,513,105 to Krones, for example, discloses a vehicle security system including a so-called "computerized key" which sends a unique digitally encoded signal through a so-called "keyport" in the vehicle to a processor and controller in the vehicle. The vehicle starting is interrupted unless the proper computerized key is presented to the keyport. A valet mode is also possible wherein the computerized key is not needed. In addition, the system may be reprogrammed to accept new replacement keys. The processor and controller may be programmed to accept and recognize authorization of a plurality of computerized keys, each having individual uniquely identifying digital numbers stored therein. A program mode may be entered by presenting an authorized key for set time, then presenting new keys to be added. In the event that the memory has been filled, a long beep is indicated and the program mode is terminated. A lost key function permits a user to return the system to the program mode and thereby authorize a new set of keys to the exclusion of the previously authorized keys. Entering the lost key mode involves disconnecting the vehicle battery for a set time.

U.S. Pat. No. 5,055,701 to Takeuchi discloses a keyless entry system using a random code portion to prevent code stealing. Along these lines, U.S. Pat. No. 4,928,098 to Dannhaeuser also discloses an electronic key wherein a new coinciding code is automatically set in the infrared transmitter and receiver after each transmission and reception event. U.S. Pat. No. 5,563,579 to Carter discloses a security system for a plurality of cars, such as on a car dealer parking lot. A key storage box is mounted to the vehicle window. The storage box also includes a sensor for determining whose key is being used to unlock the box.

Unfortunately, conventional vehicle security systems using transponders have tended to attempt to increase transponder security by adding random or pseudorandom coding to the passive transponders. Unfortunately, a security threat still exists based upon unauthorized learning of a uniquely coded transponder or other token, for example. Once such a transponder or token has been learned, the would-be thief can return to the vehicle and defeat the security system.

SUMMARY OF THE INVENTION

In view of the foregoing background, it is therefore an object of the invention to provide a vehicle control system and related method for reducing the risk of an unauthorized token being able to operate the vehicle control system.

It is another object of the present invention to provide a system and method for reducing the risk of an unauthorized token being able to operate the vehicle control system, and also permitting the owner to readily return the system to the correct operating condition after an unauthorized token has been more recently learned.

These and other objects, features, and advantages in accordance with the present invention are provided by a vehicle function control system including a token reader at the vehicle, and a controller at the vehicle for controlling at least one vehicle function responsive to the token reader. The controller preferably includes token learning means for learning the unique code of the token to define a learned token capable of controlling the vehicle function, and token verifying means for generating an indication relating to whether a new token has been learned by the token learning means to thereby alert the user of a potentially unauthorized token capable of controlling the vehicle function.

The uniquely coded token may include at least one first electrical conductor, and the token reader may include at least one second electrical conductor for connecting to the at least one first electrical conductor of the uniquely coded token and for reading the unique code. The uniquely coded token may include a uniquely coded integrated circuit, or a coded resistor matrix, for example. Also, the vehicle function control system may include a key, and the uniquely coded token may be positioned in the vehicle ignition key.

Another aspect of the invention is that the controller may comprise engine enabling means for enabling operation of the vehicle engine responsive to connecting of the learned token to the reader. In addition, the controller may include door unlocking means for unlocking of a vehicle door responsive to connecting the token to the token reader.

The token learning means may be switchable between a learning mode permitting learning of at least one token, and a secure mode. In one embodiment, the token learning means may include token deleting means for deleting all prior learned tokens based upon entering the learning mode.

The token verifying means may further include learning mode entered indicating means for indicating that the learning mode of the token learning means has been entered. The learning mode entered indicating means may comprise time lapse means for indicating when the learning mode of the token learning means has last been entered. The time lapse means, in turn, may comprise means for progressively indicating a passage of time since the learning mode has last been entered.

Alternately, the token verifying means may include learned token number indicating means for indicating a number of learned tokens. The token verifying means may also alternately include learned token change indicating means for indicating a change in a number of learned tokens or means for generating an indication relating to whether a new token has been learned by the token learning means. The verifying means may further comprise activating means for causing the indicating means to generate an indication.

Another aspect of the invention relates to the ease of returning the system to operate from a previous authorized set of tokens. According to this aspect, the vehicle function control system preferably further includes token code reset means for permitting the user to restore at least one previously learned code and remove at least one more recently learned code. The token verifying means may enter a warning mode and remains in the warning mode for a predetermined warning time responsive to a new uniquely coded token being learned. In addition, learned codes designated as current are capable of controlling at least one vehicle function, and codes designated hold are capable of being changed to current. Thus, the token code reset means may include means for changing at least one code from current to hold responsive to learning a new uniquely coded token.

The token code reset means preferably further comprises means for learning at least one new uniquely coded token as a temporary code which is also capable of controlling at least one vehicle function. The token code reset means may also include means for deleting hold codes, and converting temporary codes to current codes responsive to expiration of the predetermined warning time. In addition, the token code reset means may delete temporary codes and maintain hold codes responsive to learning a new uniquely coded token when in the warning mode.

The token code reset means may include restore means for restoring hold codes to current codes, and for deleting temporary codes responsive to learning a new uniquely coded remote token matching a hold code and when in the warning mode. Also, the restore means may cause exit from the warning mode.

A method aspect of the invention is for controlling at least one vehicle function using at least one uniquely coded token for being carried by a user. The method preferably comprises the steps of: reading the token at the vehicle via the at least one electrical conductor of the token; providing a controller at the vehicle for controlling at least one vehicle function responsive to reading the token; learning the unique code of the at least one token into the controller to define a learned token capable of controlling the at least one vehicle function; and generating an indication relating to whether a new token has been learned into the controller to thereby alert the user of a potentially unauthorized token capable of controlling the at least one vehicle function. The method may also include the step of restoring at least one previously learned code and removing at least one more recently learned code.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
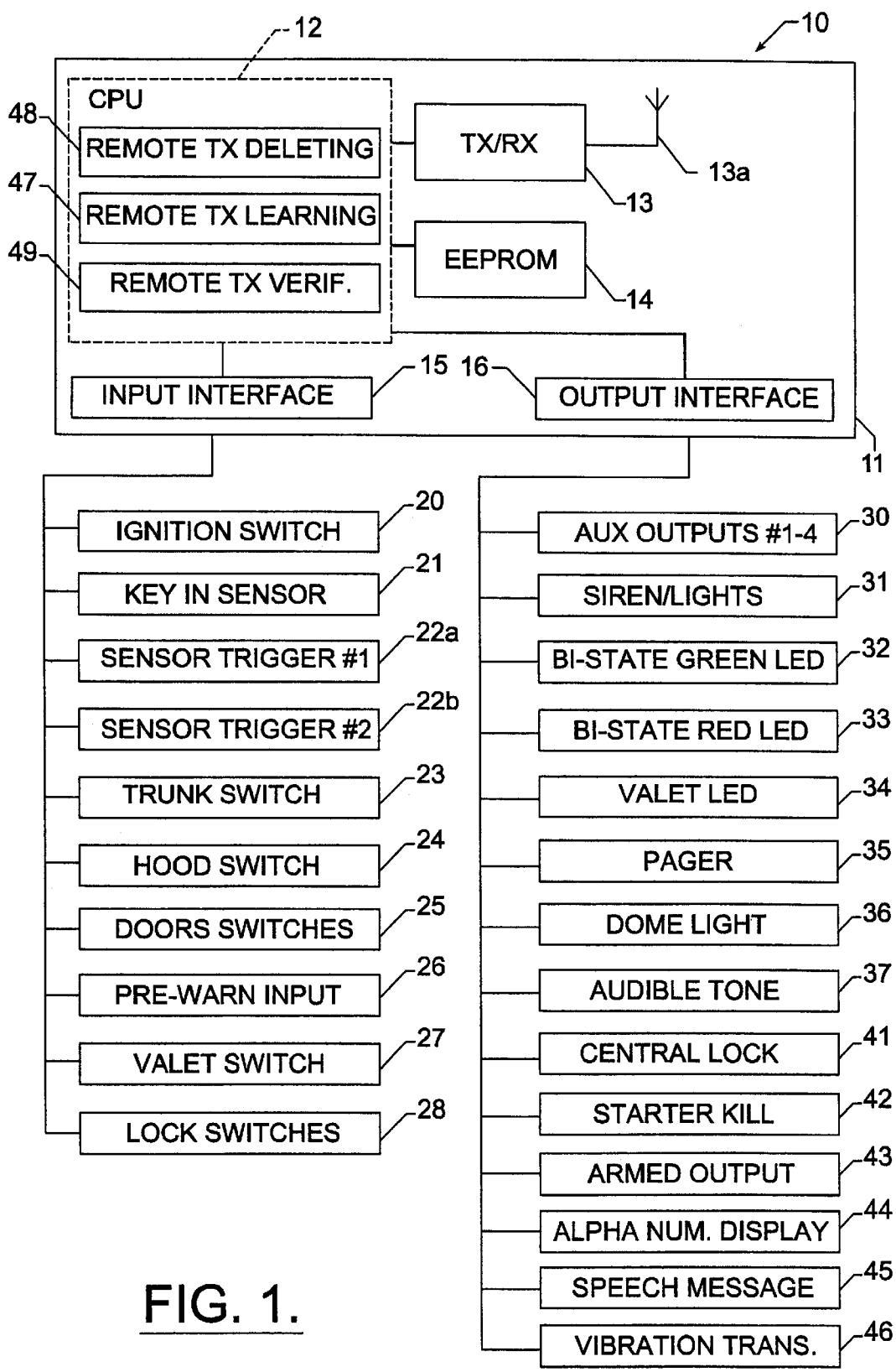
FIG. 1 is a schematic block diagram of the vehicle security system according to the invention.

Referring now to the schematic block diagram of FIG. 1, a vehicle security system 10 according to one aspect of the invention is first described. The security system includes a controller 11 which, in turn, in the illustrated embodiment, includes a central processing unit or microprocessor 12 operating under stored program control.

In the illustrated embodiment, a transmitter and receiver 13 are connected to the microprocessor 12 for receiving signals from a remote transmitter and for transmitting signals to a remote unit, as will be described in greater detail below. As would be readily understood by those skilled in the art, the transmitter portion of the controller 11 may not be needed in some embodiments of the invention. An antenna 13a is illustratively connected to the transmitter and receiver 13.

In the illustrated embodiment, the microprocessor is also operatively connected to a memory (EEPROM) 14 and an input interface 15 and an output interface 16. As would be readily understood by those skilled in the art, the microprocessor 12 may alternately or additionally have its own on-board memory.

The input interface 15 is illustratively connected to various vehicle input devices including: an ignition switch 20; a key in the ignition sensor 21; two zone sensors 22a, 22b; conventional trunk hood and door pin sensors or switches 23, 24, and 25, respectively; and door lock switches 28. In addition, a pre-warn sensor 26 and valet switch 27 also provide inputs to the controller 11 in the illustrated embodiment. As would be readily understood by those skilled in the art, other inputs are also contemplated by the present invention and are generally described herein by the term sensor. In addition, an input signal may also be received from a remote transmitter 50 (FIG. 2).

The output interface 16 of the controller 11 may preferably be connected to a plurality of output devices. As shown in FIG. 1, the outputs may include auxiliary relay outputs 30, such as for window control, remote starting, or a remote alarm indication, as would be readily understood by those skilled in the art. A siren and/or lights 31, and green and red light emitting diodes (LEDs) 32, 33 for dashboard mounting are also illustratively connected to the controller 11. Other outputs may be directed to a valet LED 34, a dome light 36, a central lock relay or lock control unit 41, a starter kill circuit 42, and an armed relay output 43. In addition, other outputs may be directed to one or more of an audible tone generator 37, an alphanumeric display 44, a speech message annunciator 45, and a vibration transducer 46, as will be readily appreciated by those skilled in the art. Other similar indicating devices are also contemplated by the present invention, as would be readily understood by those skilled in the art.

Figure 2:
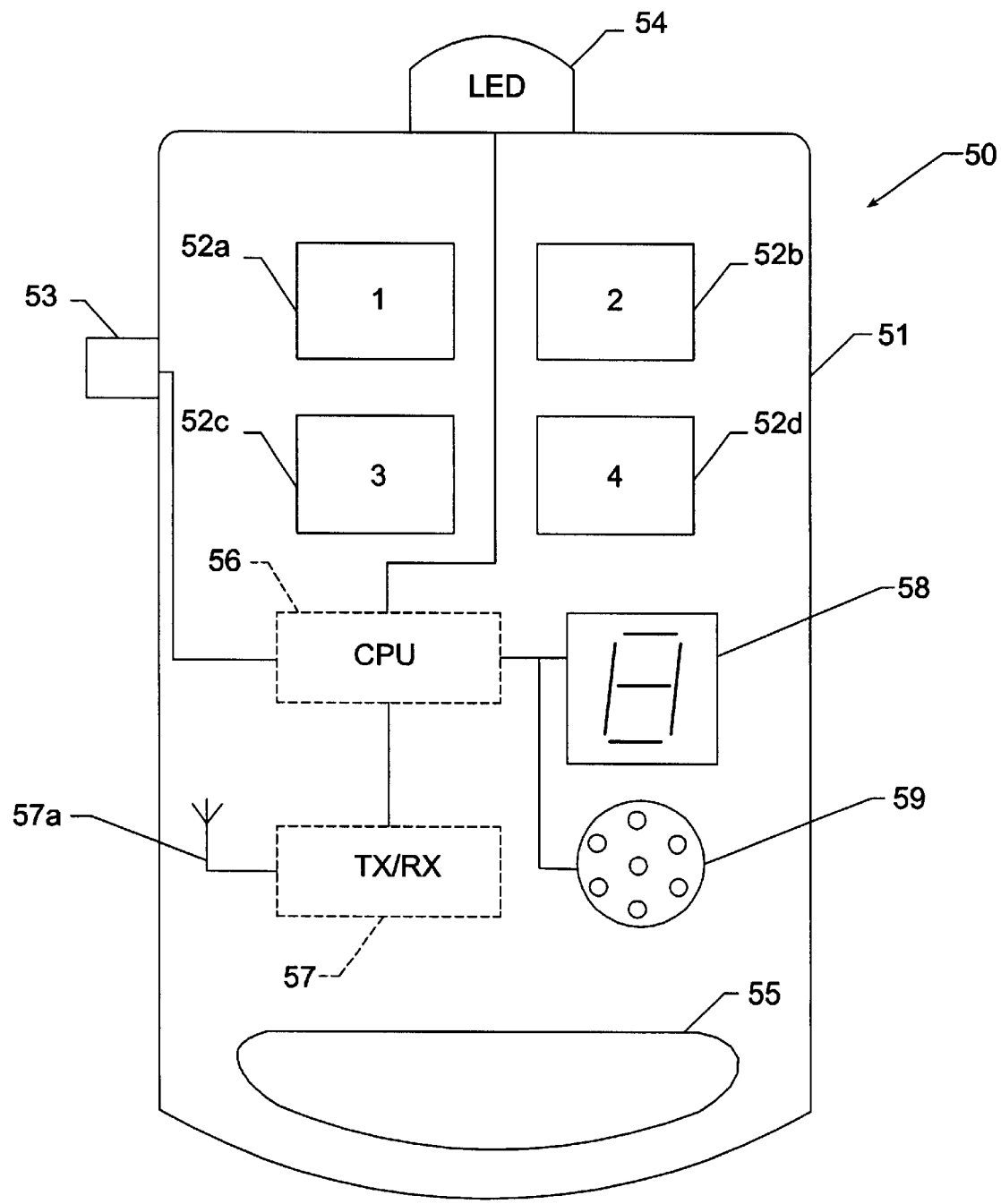
FIG. 2 is a schematic diagram of a remote transmitter for the vehicle security system according to the invention.

Referring now more particularly to FIG. 2, a remote transmitter 50 in accordance with the invention is described. The remote transmitter 50 includes a housing 51 and a plurality of first momentary contact switches 52a–52d carried by the housing. A second momentary contact switch 53 and an indicating light, such as the illustrated LED 54 are also carried by or mounted on the housing 51. As would be readily understood by those skilled in the art, the remote transmitter 50 is typically relatively small and includes an opening 55 for facilitating connection to a vehicle key ring, for example. In addition, the remote transmitter 50 includes a central processing unit or microprocessor 56 operatively connected to the plurality of first switches 52a–52d, the second switch 53, and the LED 54. The microprocessor is also connected to a transmitter and/or receiver circuit 57 and its associated antenna 57a for transmitting and/or receiving signals to and from the controller 11 of the vehicle security system 10. Accordingly, the term "remote transmitter" is used broadly herein to describe the embodiment also including receiver means.

The remote transmitter 50 may also include a numeric or alphanumeric display 58, and a speaker 59 coupled to an audible tone generator or a speech message generator, as may be provided by the microprocessor 56. A vibration transducer, not shown, may also be incorporated into the remote transmitter 50 for communicating to the user as would be readily understood by those skilled in the art.

The controller 11 preferably includes remote transmitter learning means 47 for permitting the addition or learning of a coded remote transmitter 50 to be capable of switching the controller between armed and disarmed modes, for example. In the armed mode the controller 11 is capable of generating an alarm via alarm indication means, such as the siren and/or flashing lights 31. The controller 11 generates the alarm responsive to at least one of the vehicle sensors, such as the trunk, hood and door switches 23, 24 and 25, or the other sensors 22a, 22b as would be readily understood by those skilled in the art. In the disarmed mode the controller 11 does not generate an alarm responsive to one or more of the vehicle sensors so that the user may enter the vehicle, for example.

The controller 11 preferably comprises remote transmitter verifying means 49 for generating an indication relating to whether a new uniquely coded remote transmitter has been learned by the remote transmitter learning means 47. In addition, the remote transmitter learning means 47 is preferably switchable between a learning or program mode permitting learning of a unique code of a remote transmitter 50, and a secure mode. As would be readily understood by those skilled in the art, the learning mode may be entered for a relatively short predetermined time and then automatically revert back to the secure mode to reduce the possibility of unauthorized remote transmitters being learned.

In one embodiment, the remote transmitter verifying means 49 comprises learning mode entered indicating means for indicating that the learning mode of the remote transmitter learning means has been entered. More particularly, the learning mode entered indicating means preferably comprises time lapse means for indicating when the learning mode of the remote transmitter learning means has last been entered. This indication can be provided by progressively indicating the elapsed time since the learning mode has last been entered.

According to another approach or embodiment of the invention, the remote transmitter verifying means 49 preferably comprises learned remote transmitter number indicating means for indicating a number of learned remote transmitters. In an embodiment where all remote transmitters are deleted when a new one is learned, the number of learned transmitters may change indicating that an unauthorized transmitter has been learned. Alternately, the remote transmitter verifying means 49 may comprise learned remote transmitter change indicating means for directly indicating a change in a number of learned remote transmitters. In yet another embodiment, the remote transmitter verifying means 49 preferably comprises learned remote transmitter code change indicating means for indicating a change in a unique code of the learned remote transmitters.

The remote transmitter verifying means 49 preferably includes remote transmitter indicating means for providing the indication. In other words, indicating means, such as a dashboard mounted light emitting diode 32, 33, may be flashed a number of times corresponding to the number of coded remote transmitters in one embodiment. Accordingly, the user is ensured that only the coded remote transmitters 50 under his control may operate the vehicle security system 10, and that no other remote transmitters have been surreptitiously coded to operate the controller.

Other embodiments of remote transmitter indicating means include, for example, the audible tone generator 37, numeric display 44, speech message generator 45 and vibration transducer 46 driven by the controller and associated with the vehicle. The dome light 36, headlights 31, and other LED's 32, 33 and 34 may also be used to give an indication to the user relating to the remote transmitters coded to operate the controller The remote transmitter indicating means may also be associated with or carried by a remote transmitter 50, or may be otherwise remote from the vehicle and be communicated to the remote site via a satellite or cellular telephone connection. For example, the indication means may be provided by a light 54, an alphanumeric display 58, a speech or tone generator 59, and a vibration transducer, for example, carried by the remote transmitter 50 (FIG. 2). Alternately, a remote monitoring station may be provided to monitor one or a plurality of vehicles in cooperation with the transmitter verifying means of each respective vehicle. In addition, a pager may be carried by the user to provide the indication.

The indication given to the user may preferably be the number of coded remote transmitters currently capable of switching the controller 11 to the disarmed mode from the armed mode. Alternately, the indication may be related to a change in the number of coded remote transmitters or a change in a code of a learned remote transmitter. The various indicating means and remote transmitter verifying means may also be used to simply alert the user that the learning mode has been recently entered. Accordingly, the remote transmitter verifying means 49 provides an indication relating to whether one or more remote transmitters has been added or learned without the owner's consent or knowledge. The indicating means may also further comprise repeater means for repeating an indication relating to the number of coded transmitters 50 for a predetermined time period or a predetermined number of repetitions.

Should the user determine that an unauthorized remote transmitter has been added or learned to operate the controller 11, the controller in one embodiment also preferably includes remote transmitter deleting means 48 for permitting deletion of the newly added unauthorized remote transmitter or all of the coded remote transmitters 50 capable of switching the controller between the armed and disarmed modes. In one embodiment, the deleting means preferably comprises means for deleting all of the previously learned remote transmitters. All of the previously learned remote transmitters may be deleted based upon entering the learning mode, that is, either when the learning mode is initially entered or when the first remote transmitter is learned, for example. If all of the coded remote transmitters are deleted by the deleting means 48, the authorized transmitters may thereafter be added by the remote transmitter learning means 47 as would be readily understood by those skilled in the art. As described in greater detail below, in another embodiment, transmitter code reset means may be provided to remove a newly learned code and restore a previously learned code.

The vehicle security system 10 also preferably includes activating means for activating the remote transmitter indicating means responsive to a predetermined condition. For example, the indicating means may be triggered by the activating means responsive to operation of one of a signal from the remote transmitter 50; a manually operable switch, such as the valet switch 27; an ignition switch 20, including a key in the switch sensor 21; a door position switch 25; and a door lock switch 28. For example, the valet switch, ignition switch, remote transmitter buttons, or other manual switches could be operated in a predetermined sequence to activate the indicating means. Other similar means for activating the indicating means are also contemplated by the invention, and will be readily appreciated by those skilled in the art.

Referring now additionally to FIGS. 3–7, various embodiments of the token verification feature of the present invention are further described. Of course, in some embodiments described herein the token includes a transmitter, and hence the same principles and features apply as described above for the remote transmitter verification feature.

Figure 3:
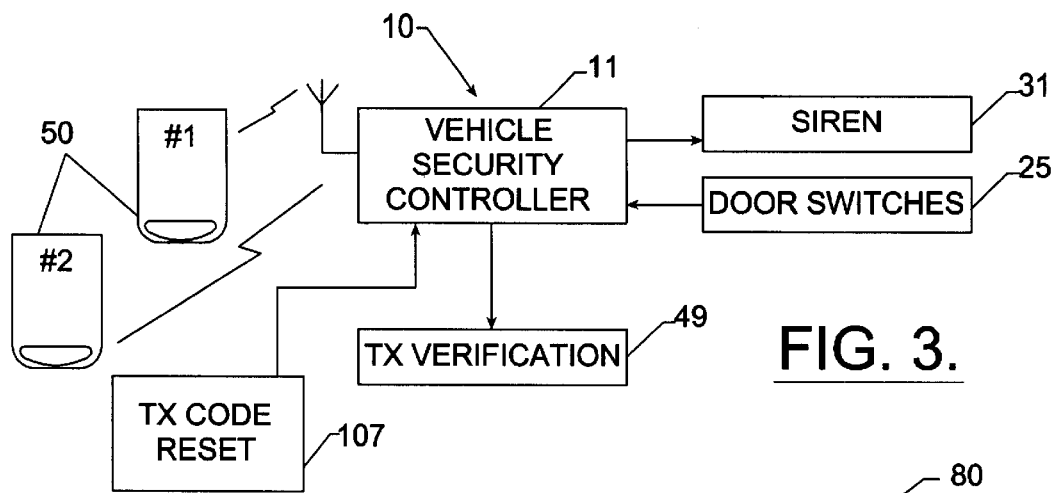
FIG. 3 is a schematic diagram of a remote control vehicle security system according to the present invention.

A vehicle security system 10 is schematically illustrated in FIG. 3 including the controller 11 along with the siren 31 and door switches 25. The transmitter verifying means 49 is illustrated in a separate block for clarity, although those of skill in the art will recognize that the logic features of the transmitter verifying means may be readily implemented via the microprocessor of the controller. Two illustrated remote transmitters 50 are capable of witching the controller 11 between armed and disarmed modes. When in the armed mode, tripping of the vehicle door switches 25 may typically activate the siren 31. In addition, the door switches 25 may also be used as part of the activation means to cause the transmitter verifying means to give an indication relating to an unauthorized remote transmitter.

Figure 4:
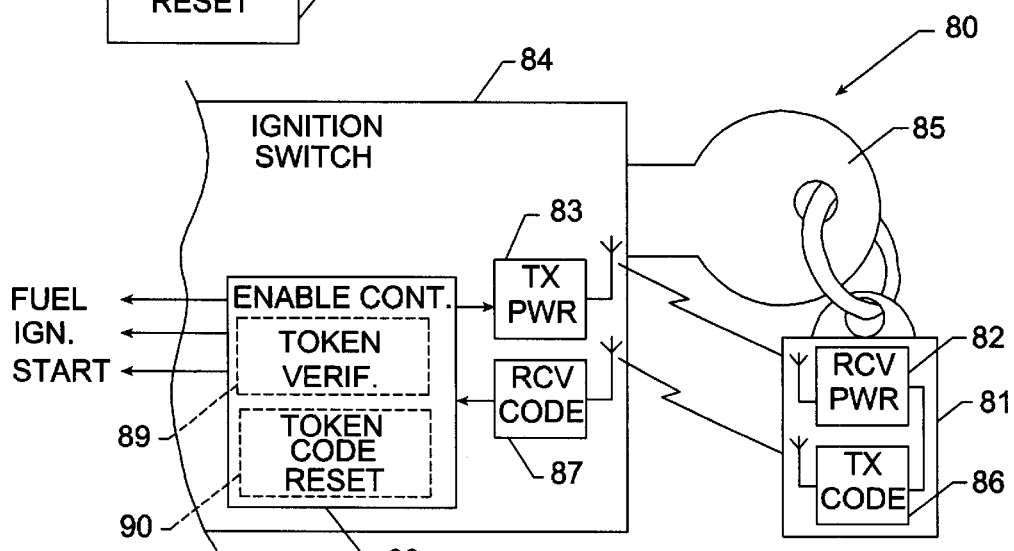
FIG. 4 is a schematic diagram of a vehicle control system including a coded transponder positioned in a token adjacent the ignition switch according to the invention.

Referring now more particularly to FIG. 4, an engine start or run enable vehicle security system 80 is illustrated as another example of the remote transmitter verification aspect of the present invention applied to a token. In other words, a token may be uniquely coded. Moreover, a plurality of such tokens may be individually coded. The token is illustratively in the form of a passive transponder 81 which includes a power receiver 82 for capturing radiated power from the power transmitter 83 positioned adjacent the ignition switch 84. In the illustrated embodiment, the ignition switch 84 still receives a conventional key 85, although those of skill in the art will appreciate that in other embodiments, the transponder 81 by itself may enable starting and running of the engine, as well as unlock the steering wheel without requiring a separate mechanical key.

When the transponder 81 is brought sufficiently close to the ignition switch 84, it receives enough power to supply the coded transmitter 86 which, in turn, transmits a coded signal to the illustrated code receiver 87. The enable controller 88 includes the illustrated token verification means 89 which operates as described above for the uniquely coded remote transmitters. In addition, the enable controller 84 also includes the token code reset means 90 which as will be described further below, permits the user to readily reactivate or reset previously learned codes and delete new codes which may have been surreptitiously added. The token verification means 89 may give an indication via any of the approaches as described above for the remote transmitter verification means and needs no further description herein.

Figure 5:
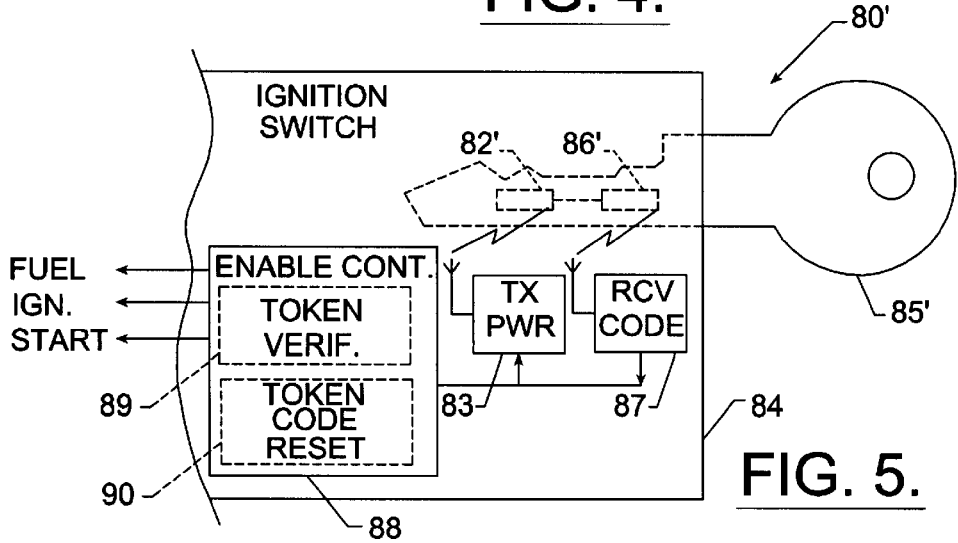
FIG. 5 is a schematic diagram of a vehicle control system including a coded transponder positioned within the ignition key according to the present invention.

The embodiment of the vehicle security system 80' shown in FIG. 5 includes the power receiver 82' and the code transmitter 86' embedded in the key 85'. The other components include similar reference numerals to the components described above with reference to FIG. 4. Accordingly these components need no further description. In other words, in this embodiment, the key 85' serves as the uniquely coded token carried by the user, rather than the separate passive transponder 81 as in FIG. 4.

Figure 6A:
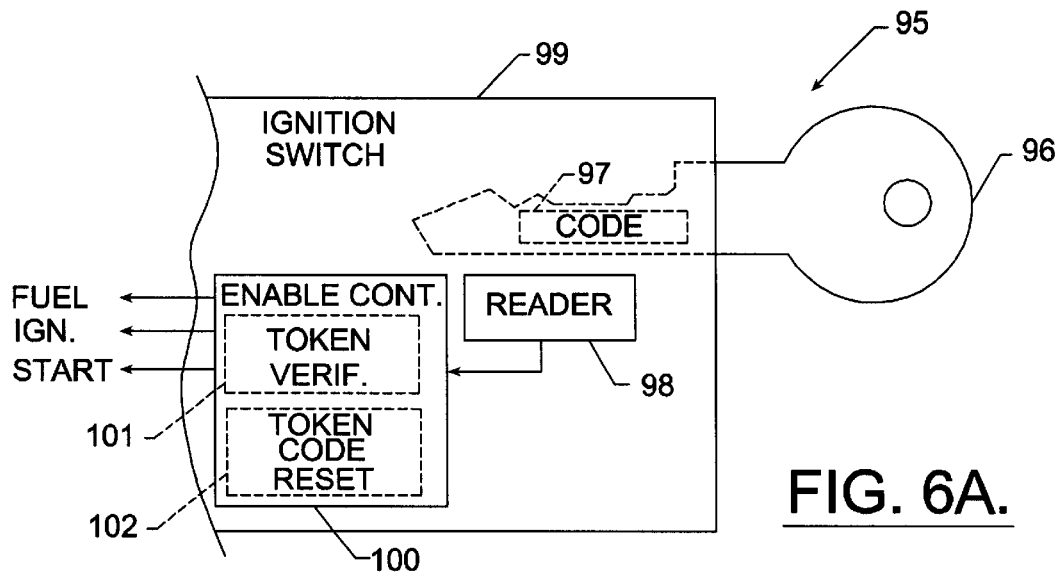
FIG. 6A is a schematic diagram of a vehicle control system including a code reader for a coded key according to the invention.

Turning now to FIG. 6A another variation of the engine start and run enable vehicle security system 95 associated with a vehicle ignition switch 99 is now described. In this system 95 the key 96 includes an embedded readable portion 97. Those of skill in the art will appreciate that the embedded readable portion 97 may include a particular electrical resistance, a magnetic element, an optical element, an integrated circuit, or any other similar device capable of generating in the associated reader 98 a uniquely coded signal. Again, in this system 95, the key 96 serves as the token which is read to enable the vehicle to be started and driven. In addition, the vehicle security system 95 includes an enable controller 100 which also includes the illustrated token verification means 101 and the token code reset means 102. Of course, as will be readily appreciated by those skilled in the art, the code generating element or portion 97 need not be carried by the illustrated key 96, but can be carried by a substrate, such as a plastic card, or in any device which is customarily kept in the user's possession so as enable the user to operate the vehicle.

Figure 6B:
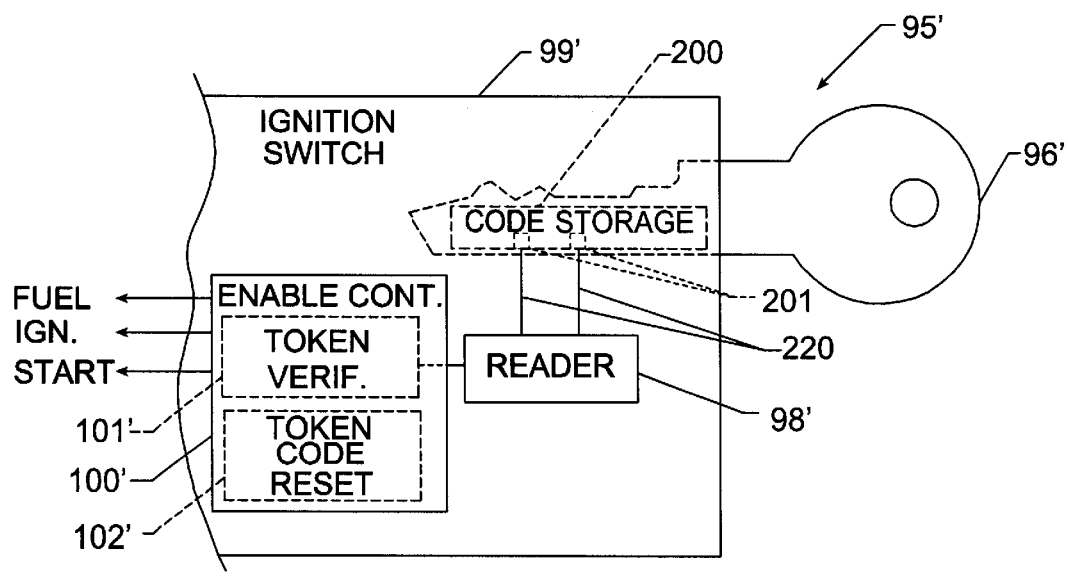
FIG. 6B is a schematic diagram of another vehicle control system including a code reader for a coded key according to the invention.

Yet another variation of the engine start and run enable vehicle security system 95' associated with a vehicle ignition switch 99' is shown in FIG. 6B. In this system 95' the key 96' includes a pair of first electrical conductors 201 embedded therein. The key 96' is adapted to store a unique code via the schematically illustrated code storage device 200. The token reader 98' also includes a corresponding pair of second electrical conductors 220 which come into electrical contact with the pair of first electrical conductors 201 when the key 96' is inserted into the ignition switch 99'. The token reader 98' may thereby provide power to the code storage device 200 and read the unique code therefrom.

The code storage device 200 may include a resistor matrix, although those of skill in the art will appreciate that other similar devices capable of generating a uniquely coded signal, such as an integrated circuit, may also be used. The other components are designated by similar reference numerals to the components described above with reference to FIG. 6A. Accordingly, these components need no further description.

Figure 6C:
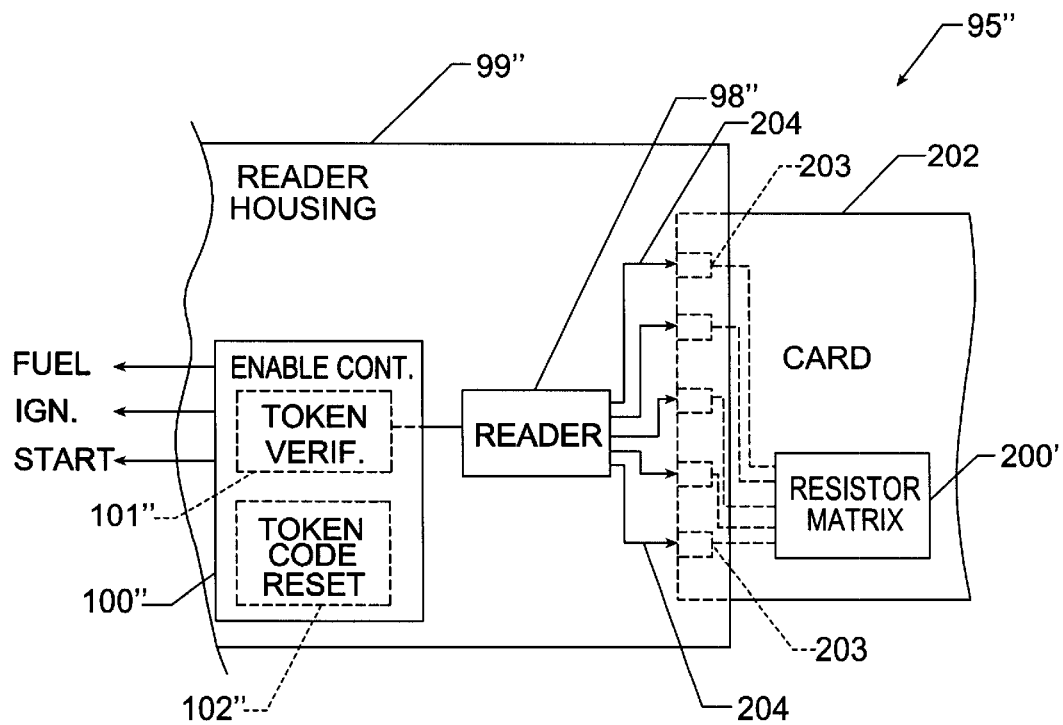
FIG. 6C is a schematic diagram of yet another vehicle control system including a code reader for a coded card according to the invention.

Referring now to FIG. 6C a further variation of the engine start and run enable vehicle security system 95" is now described. In this system 95" a uniquely coded token includes a card 202 and a resistor matrix 200' attached to the card and storing a unique code. gain, other suitable devices known to those of skill in the art, such as an integrated circuit, may also be used.

The resistor matrix 200' is connected to a plurality of first electrical conductors 203. The token reader 98" also includes a corresponding plurality of second electrical conductors 204 which come into electrical contact with the plurality of first electrical conductors 203 when the card 202 is inserted into the reader housing 99". The token reader 98" may thereby provide power to the resistor matrix 200' and read the unique code therefrom. Once again, the components having reference numerals similar to those described above need no further discussion.

Figure 6D:
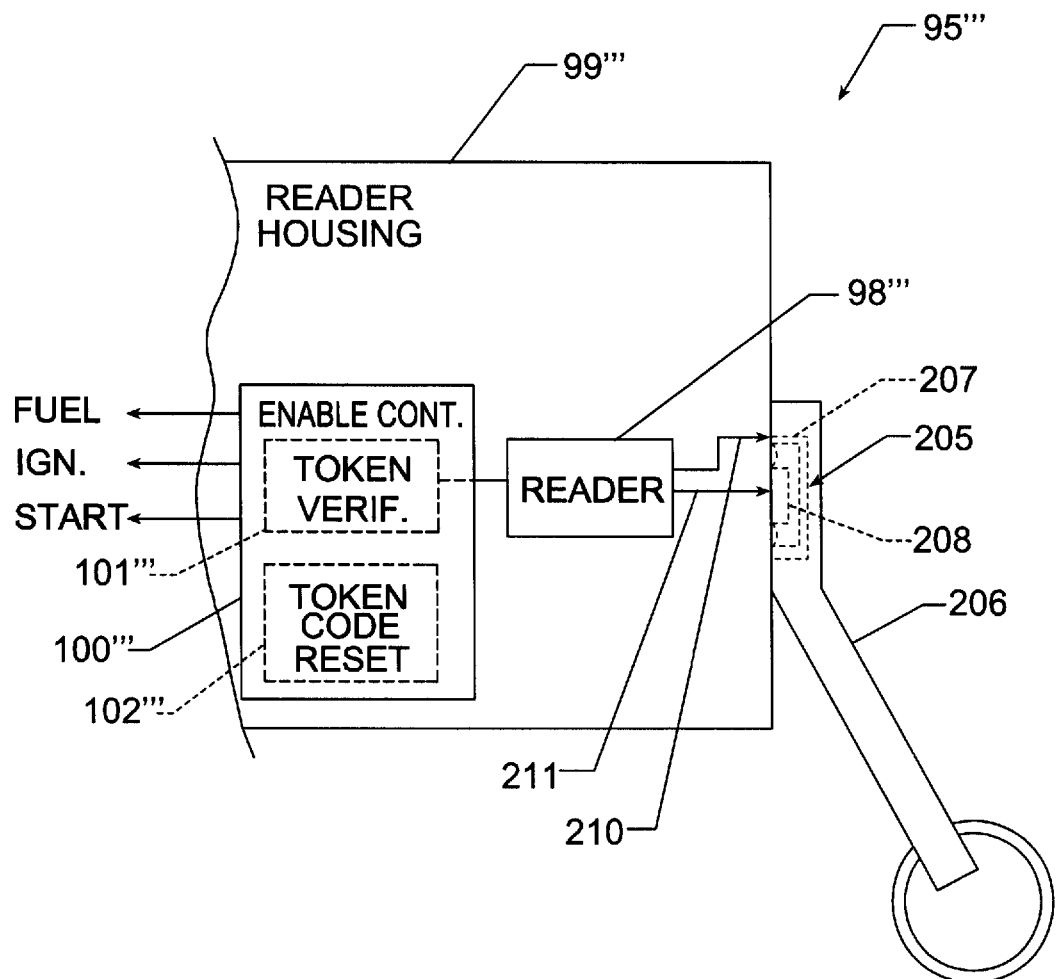
FIG. 6D is schematic diagram of still another vehicle control system including a code reader for a coded integrated circuit according to the invention.

Still another variation of the engine start and run enable vehicle security system 95''' is now described with reference to FIG. 6D. In this system 95''' the uniquely coded token includes an integrated circuit device 205 which stores a unique code. The integrated circuit device 205 may be mounted on a key ring 206 to facilitate carrying by the user. The integrated circuit device 205 may be an iButton™ manufactured by Dallas Semiconductor, although other suitable devices known to those of skill in the art may be used. When the integrated circuit device 205 comprises an iButton™, the integrated circuit device has a package including an outer contact portion 207 and an inner contact portion 208 very similar to a watch battery, for example. Electrical conductors 210, 211 provide an electrical connection between the token reader 98''' and the outer contact portion 207 and the inner contact portion 208, respectively. As such, the token reader 98''' may thereby provide power to the integrated circuit device 205 and read the unique code therefrom.

Figure 7:
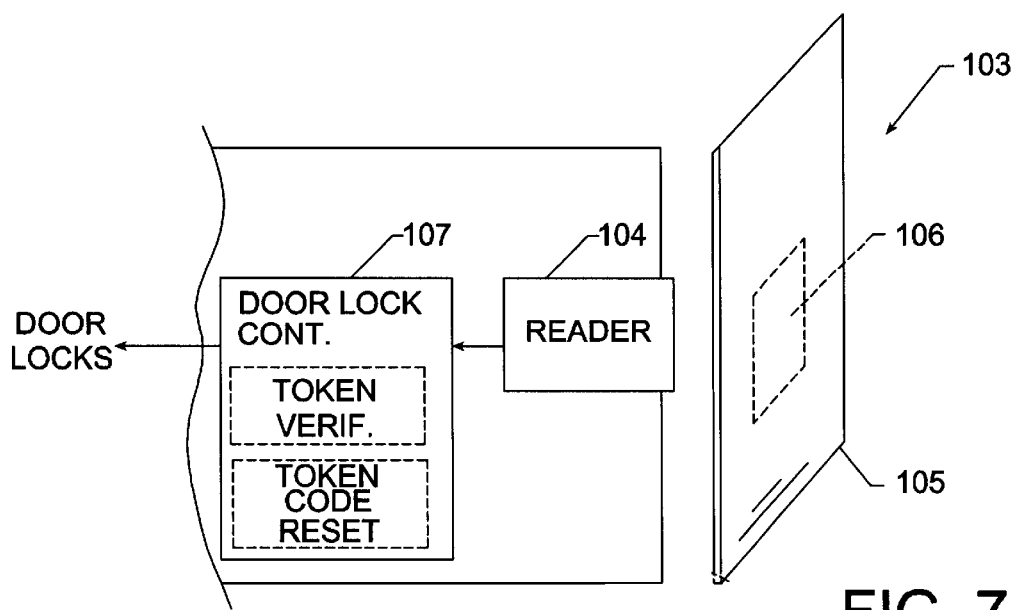
FIG. 7 is a schematic diagram of a vehicle control system including a reader associated with vehicle door lock control and a token in the form of a card according to the invention.

Expanding these concepts of token verification and token code reset, FIG. 7 shows their implementation in a vehicle security system 103 for operating the vehicle door locks. More particularly, a reader 104 is mounted at a location on the vehicle, such as near the door handle, for example. The reader 104, may be of any type, such as optical, magnetic, electrical, etc. as will be readily appreciated by those skilled in the art. In the illustrated embodiment, the token is provided in the form of a plastic card 105. The card 105 carries an embedded code generating element 106. The code generating element 106 cooperates with the reader 104 when brought into proximity or contact therewith to generate a unique code for the card 105. As a further example, the card 105 may have an embedded integrated circuit therein to communicate with the reader 104 along the lines of a so-called "smart card" as will be readily appreciated by those skilled in the art. The reader 104 is operatively connected to the schematically illustrated door lock controller 107.

The door lock controller 107 includes the token verification means 108 and token code reset means 109. The token verification means 108 has been described already and will be further described below. The token code reset means 109 will also be further described below. In short, the token verification alerts the user that an unauthorized token may have been learned into the system, while the token code reset provides the user with a convenient way to reinstate the previous token codes. Those of skill in the art will appreciate other vehicle related control features that are contemplated by the present invention in addition to engine starting and door lock control.

Returning now again to the concept of remote transmitter verification. A method aspect in accordance with the present invention is for increasing security in permitting remote control of a function associated with a vehicle and using at least one uniquely coded remote transmitter 50, and a receiver 13 within the vehicle for receiving a signal from the uniquely coded remote transmitter. The method preferably comprises the steps of: storing in a memory 14 a unique code of a remote transmitter 50 to define a learned remote transmitter capable of causing performance of a function associated with the vehicle, and generating an indication relating to whether a new uniquely coded remote transmitter has been stored in the memory to thereby alert the user of a potentially unauthorized learned remote transmitter capable of remotely performing the function associated with the vehicle.

Figure 8:
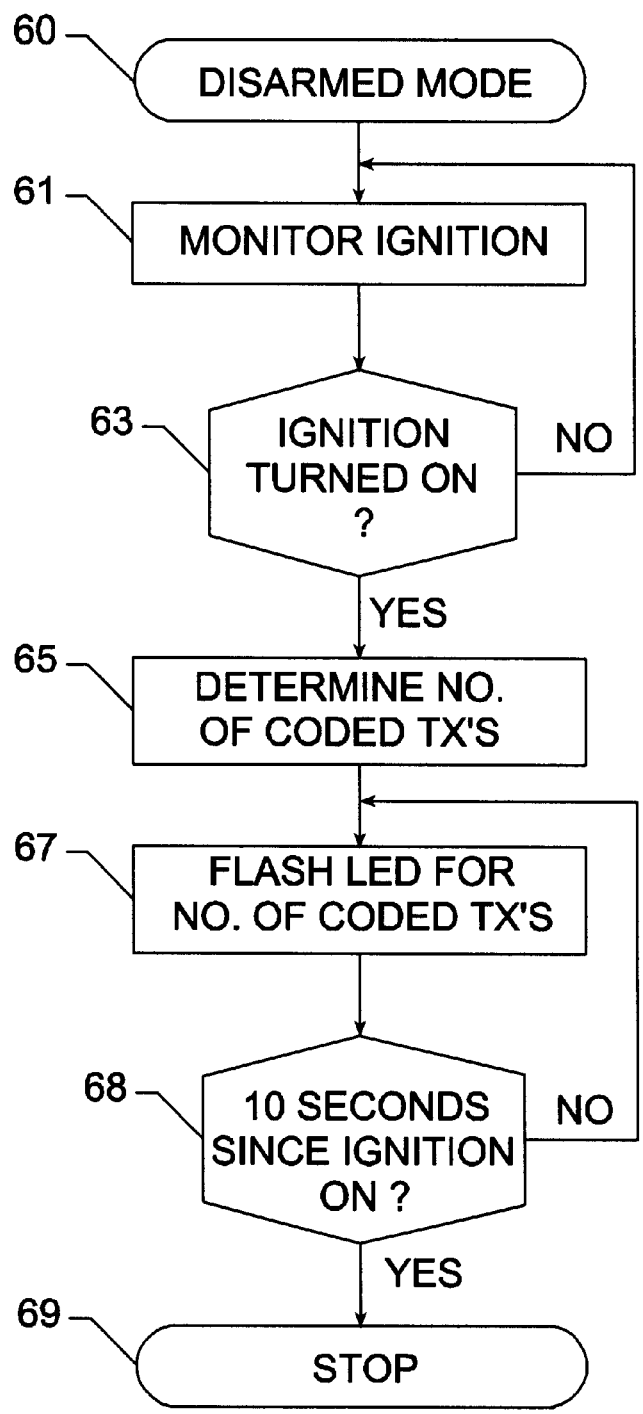
FIGS. 8 and 9 are flow charts illustrating examples of remote transmitter verification according to the invention.

A particular example of the transmitter verification feature of the present invention is explained with further reference to the flow chart of FIG. 8. In this example, the vehicle security system controller 11 (FIGS. 1 and 3) preferably includes ignition switch monitoring means 20 (FIG. 1) for determining whether a vehicle ignition switch is in an off position or an on position as monitored at Block 61 and when the controller is in the disarmed mode (Block 60). If the ignition is switched on (Block 63), the number of coded remote transmitters 50 (FIGS. 1–3) is determined or verified (Block 65). The controller 11 also preferably includes activating means for activating an LED 32, 33 (FIG. 1) to indicate the number of coded transmitters 50 at Block 67 responsive to turning the vehicle ignition to the on position and when the controller 11 is in the disarmed mode. The number of coded transmitters 50 may be repeated for a predetermined time, such as ten seconds, at Block 68. The verification feature is then stopped (Block 69). If unsure, the driver could turn the ignition off, and then back to the on position, to again verify the number of coded remote transmitters 50. Those of skill in the art will readily appreciate alternate embodiments incorporating other indicating means or activating means as described in greater detail herein. This same procedure or an equivalent thereto, can also be used to verify and indicate the tokens uniquely coded to operate a control system as shown in FIGS. 4–7 in accordance with the present invention.

Figure 9:
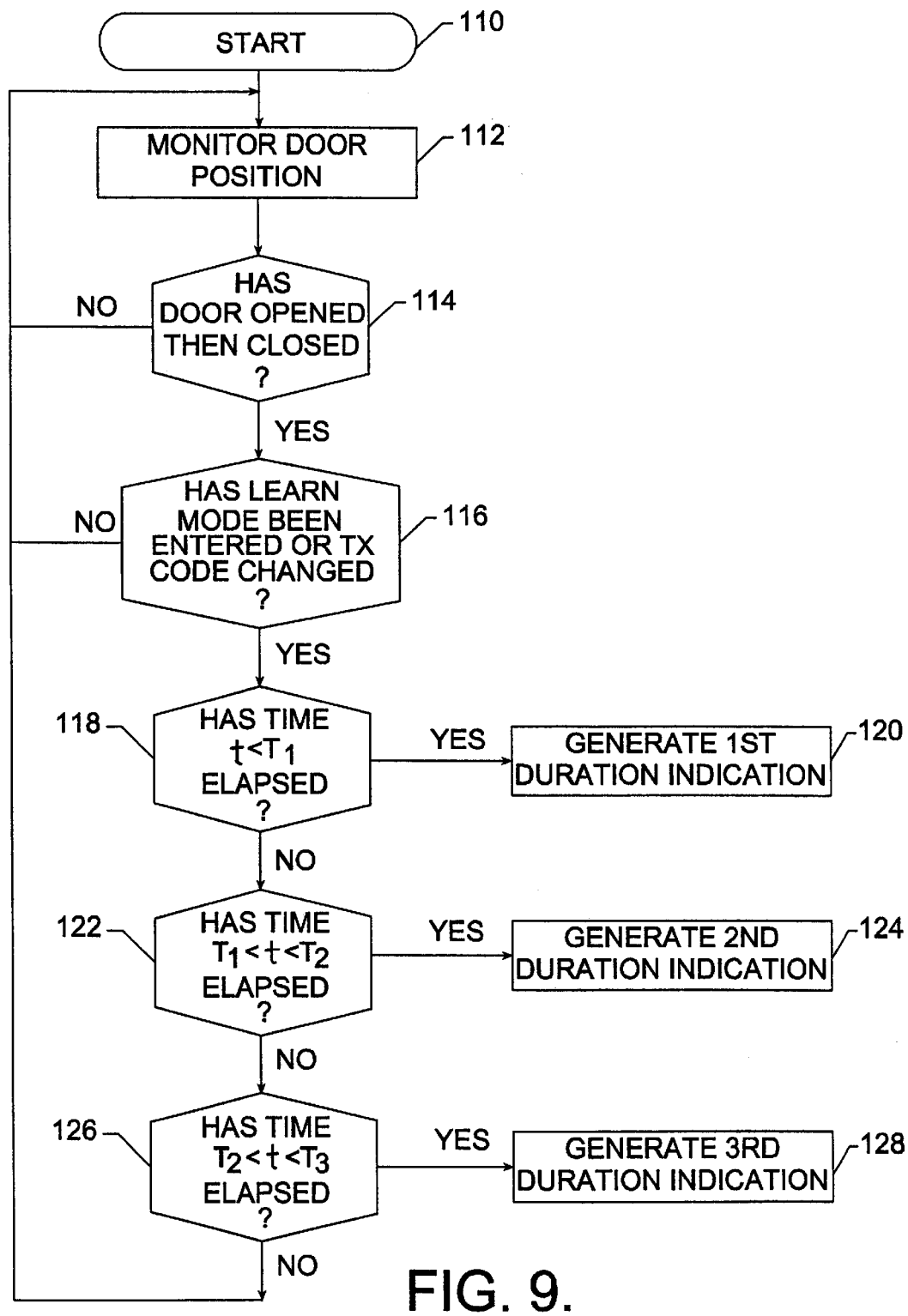

Referring to the flow chart of FIG. 9, another variation of operation of the vehicle security system 10 is now explained. From the start (Block 110), the door position is monitored at Block 112. If a door, such as the driver's door, has been determined at Block 114 to have been opened and closed, it is next determined whether the remote transmitter learn mode has been entered or a remote transmitter code changed at Block 116. If the door has not been opened and closed, or the learn mode or transmitter code not changed, the system returns to monitoring the door position at Block 112.

If the learn mode has been entered or the code changed, the elapsed time t since that event is compared against a threshold T1 at Block 118. If the elapsed time t is less that T1, then a first duration signal may be generated at Block 120. If the elapsed time t is between T1 and a second threshold T2 as determined at Block 122, then a second duration indication can be generated (Block 124). Similarly, if the elapsed time t is between T2 and a third threshold T3 as determined at Block 126, then a third duration indication may be given at Block 128. The sequence can be extended or shortened as would be readily appreciated by those skilled in the art.

For example, if the learn mode has been entered within the prior forty-eight hours, an indicating light may be illuminated for a thirty second duration responsive to the activation means. The duration could thereafter be decremented five seconds for each 48 hours of elapsed time, so that the indication would eventually automatically terminate with the passage of sufficient time. As another example, the light could be illuminated for ninety seconds the first day, and decrement ten seconds each day thereafter. It is desirable that the indication inform the user of how recently the learn mode or transmitter change has been made so that the user may correlate the change with someone's ability to access the system. An appropriate voice message could also be generated alerting the user to when the learning mode was last entered, for example. Again, this variation of verification and indication for a coded remote transmitter may be directly applicable and used with the token verification and indication as shown in FIGS. 4–7 as will be readily appreciated by those skilled in the art.

Another aspect of the invention relates to the transmitter code reset means which permits the user to restore at least one previously learned code and remove at least one more recently learned code. The remote transmitter verifying means may enter a warning mode and remain in the warning mode for a predetermined warning time responsive to a new uniquely coded remote transmitter being learned. In addition, the learned codes designated as current are capable of switching the alarm controller, for a vehicle security system, for example, and the codes designated hold are capable of being changed to current. Accordingly, the transmitter code reset means preferably comprises means for changing at least one code from current to hold responsive to learning a new uniquely coded transmitter.

The transmitter code reset means may further comprise means for learning at least one new uniquely coded transmitter as a temporary code which is also capable of switching the alarm controller. The transmitter code reset means may further include means for deleting hold codes, and converting temporary codes to current codes responsive to expiration of the predetermined warning time. Also, the transmitter code reset means may delete temporary codes and maintaining hold codes responsive to learning a new uniquely coded transmitter when in the warning mode.

The transmitter code reset means may also include restore means for restoring hold codes to current codes, and for deleting temporary codes responsive to learning a new uniquely coded remote transmitter matching a hold code and when in the warning mode. The restore means may also further comprise means for exiting the warning mode.

The various means associated with the transmitter code reset feature may be readily implemented using the processor of the controller, for example, or may be implemented using conventional logic and signal processing circuitry as will be readily appreciated by those skilled in the art. In addition, transmitter code reset means may be used in remote starting, remote keyless entry and other similar applications as will also be readily appreciated by those skilled in the art.

Turning now additionally to the flow chart of FIG. operation of the transmitter code reset function of the present invention is further described. From the start (Block 140), the user may enter the controller into the transmitter learning mode at Block 146. Entry into the learning mode has been described above, however, those of skill in the art will appreciate that there are many other equivalent techniques to cause the controller to enter the transmitter learning mode.

Once in the learning mode, it is determined at Block 146 whether a new transmitter code has been received. If a code is received, then at Block 148 it is determined whether the 48 hour Automatic Transmitter Verification (ATV) warning period as described above is still in progress. Of course the time could be changed to any suitable value depending on the application. If the controller is not currently in the ATV warning period, then the ATV warning period is started at Block 150, and remote transmitter codes are moved from a current file to a hold file. As would be readily appreciated by those skilled in the art, the codes may not necessarily be transferred to another portion of memory, for example, rather a designation for the code may simply be updated.

At Block 160, the controller learns the newly received transmitter codes to a so-called temporary file. The newly learned transmitter codes remain in the temporary file or keep their temporary designation and are used to operate the controller upon exit from the learning mode (Block 162) as will be readily appreciated by those skilled in the art.

Figure 10:
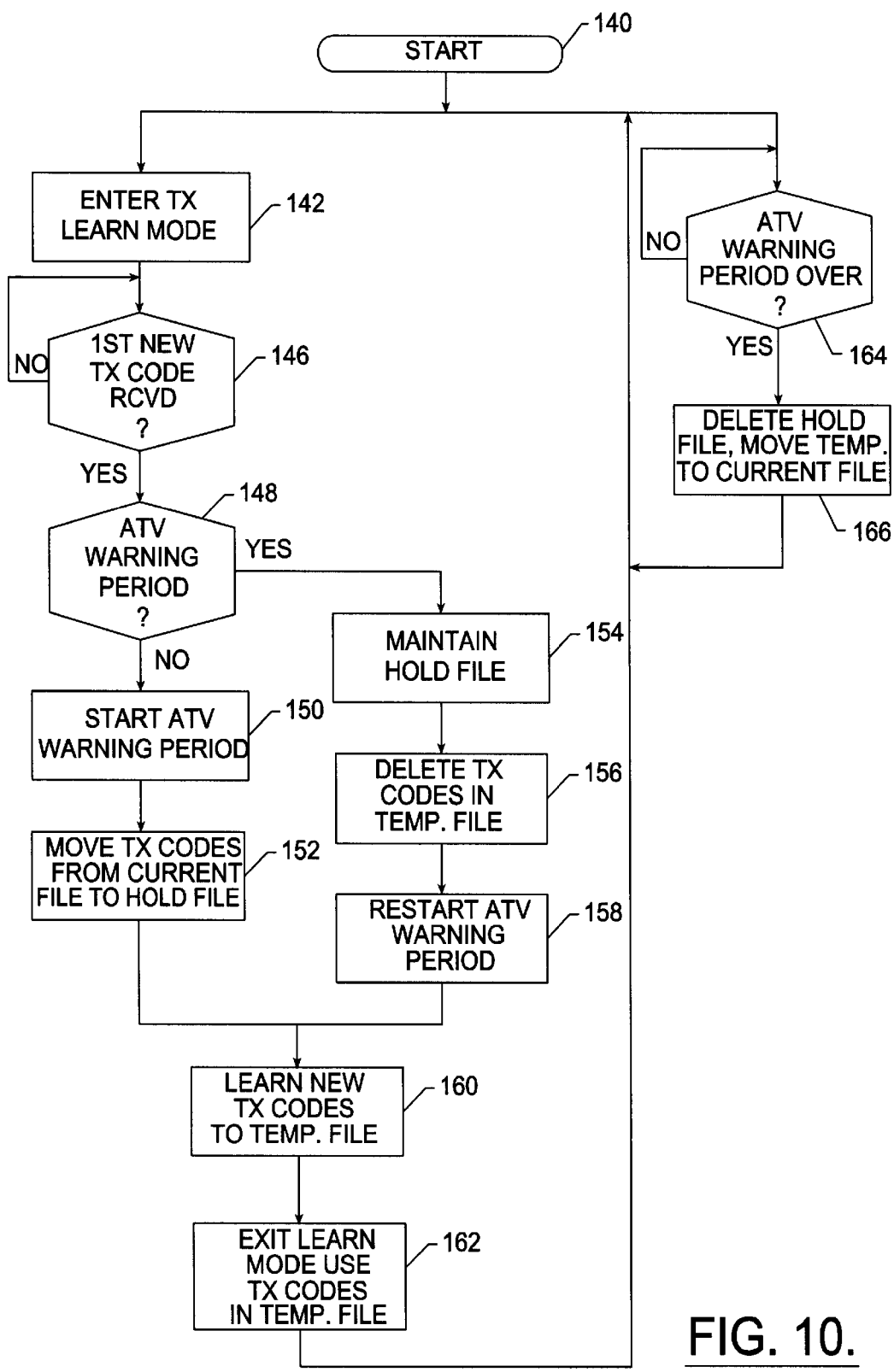
FIG. 10 is a first flow chart illustrating a portion of the transmitter code reset feature in accordance with the present invention.

Turning now briefly to the upper right-hand portion of FIG. 10, at Block 164 it is determined whether the ATV warning period has expired. If so, the transmitter codes in the hold file are deleted, and the transmitter codes in the temporary file are moved to the current file. In other words, once the ATV warning period expires, the hold file contents are deleted and the temporary codes become the current codes. The current code operate the controller until the learning mode is again entered.

If during the learning mode, the ATV warning period was already active as determined at Block 148, the hold file contents are maintained (Block 154). In addition, the transmitter codes in the temporary file are deleted at Block 156. Accordingly, this defeats the would-be thief from entering the learning mode several times without the user's knowledge. In other words, the codes in the hold file should be those previously authorized by the user.

At Block 158 the ATV warning period may be restarted. Thereafter, the controller learns the new transmitter codes into the temporary file (Block 160), and the system operates with the new temporary codes upon exit from the learning mode (Block 162).

Figure 11:
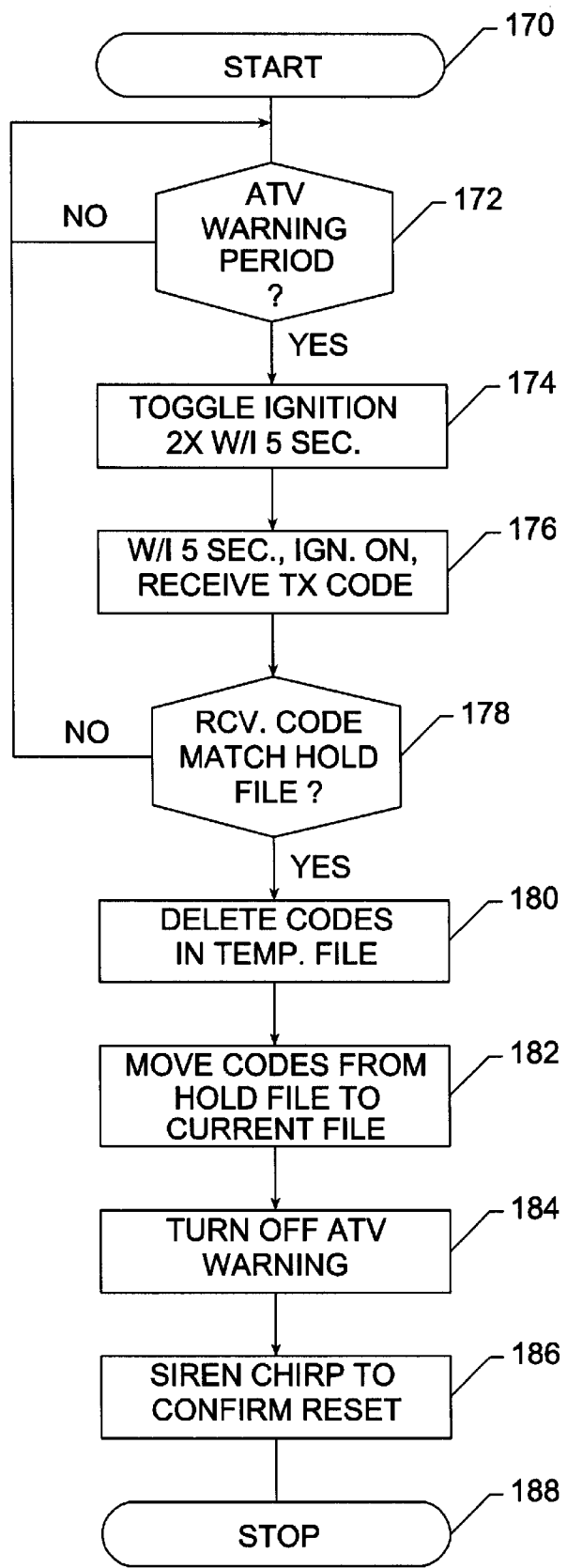
FIG. 11 is a second flow illustrating another portion of the transmitter code reset feature in accordance with the present invention.

Turning now additionally to the flow chart of FIG. 11, a method for returning the proper transmitter codes to operate the system and to delete any unauthorized codes is explained. The user desires both security and convenience. From the start (Block 170), if the system is still in the ATV warning period as determined at Block 172, then the user may toggle the ignition switch on and off two times within 5 seconds (Block 174). The user may then transmit a code from a transmitter in his possession, and if the ignition is on, and was toggled within the last 5 seconds, then the system will compare the received code with the hold file codes (Block 178).

If the just received code matches a code in the hold file, then the codes in the temporary file are deleted at Block 180. This removes the temporary codes that may have been surreptitiously added by a would-be thief. In addition, the transmitter codes from the hold file are then moved to the current file (Block 182). This restores the user's previous authorized hold codes to operate the system. The ATV warning is turned off at Block 184, and the siren may be chirped at Block 186, before stopping (Block 188), to thereby provide the user with confirmation that the codes from the temporary file have been deleted, and the codes from the hold file have been re-activated or changed to the current designation or file.

Of course, the token code reset features and functions may be the same or equivalent to those described for the remote transmitter code reset means. Accordingly, the flow charts for the remote transmitter code reset are applicable to the token code reset features as will be readily appreciated by those skilled in the art. Accordingly, the token code reset means may also provide the ability for the user to reset a prior group of token codes once alerted by the token verification features.

Further information relating to the vehicle security system and aspects thereof may be found in parent U.S. patent application Ser. No. 08/622,515 and parent patent U.S. Pat. No. 5,654,688, both assigned to the assignee of the present invention and incorporated herein by reference in their entirety. In addition, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle function control system comprising:
   at least one uniquely coded token for being carried by a user and comprising at least one first electrical conductor;
   a token reader at the vehicle comprising at least one second electrical conductor for connecting to the at least one first electrical conductor of said at least one uniquely coded token and for reading the unique code therefrom; and
   a controller at the vehicle for controlling at least one vehicle function responsive to said token reader, said controller comprising
      token learning means for learning the unique code of said at least one uniquely coded token to define at least one learned uniquely coded token for controlling the at least one vehicle function, and
      token verifying means for generating an indication relating to whether a new uniquely coded token has been learned by said token learning means to thereby alert the user of a potentially unauthorized learned uniquely coded.

2. A vehicle function control system according to claim 1 wherein said at least one uniquely coded token comprises a uniquely configured resistor matrix.

3. A vehicle function control system according to claim 1 wherein said at least one uniquely coded token comprises a uniquely coded integrated circuit.

4. A vehicle function control system according to claim 1 further comprising a vehicle ignition key; and wherein said at least one uniquely coded token is positioned in the vehicle ignition key.

5. A vehicle function control system according to claim 4 wherein said controller comprises engine enabling means for enabling operation of the vehicle engine responsive to connecting the at least one learned uniquely coded token to said token reader.

6. A vehicle function control system according to claim 1 wherein said token reader provides power to said at least one uniquely coded token when connected thereto so that said at least one uniquely coded token requires no internal power source.

7. A vehicle function control system according to claim 1 wherein said controller comprises door unlock means for unlocking at least one vehicle door responsive to connecting the at least one learned uniquely coded token to said token reader.

8. A vehicle function control system according to claim 1 wherein said token learning means is switchable between a learning mode permitting learning of the unique code of said at least one uniquely coded token, and a secure mode.

9. A vehicle function control system according to claim 8 wherein said token learning means comprises token deleting means for deleting the unique codes of all prior learned uniquely coded tokens based upon entering the learning mode.

10. A vehicle function control system according to claim 8 wherein said token verifying means comprises learning mode entered indicating means for indicating that the learning mode of said token learning means has been entered.

11. A vehicle function control system according to claim 10 wherein said learning mode entered indicating means comprises time lapse means for indicating when the learning mode of said token learning means has last been entered.

12. A vehicle function control system according to claim 11 wherein said time lapse means comprises means for progressively indicating a passage of time since the learning mode has last been entered.

13. A vehicle function control system according to claim 1 wherein said token verifying means comprises learned token number indicating means for indicating a number of learned tokens.

14. A vehicle function control system according to claim 1 wherein said token verifying means comprises learned token change indicating means for indicating a change in a number of learned tokens.

15. A vehicle function control system according to claim 1 wherein said token verifying means comprises indicating means for generating an indication relating to whether a new uniquely coded token has been learned by the token learning means.

16. A vehicle function control system according to claim 15 wherein said indicating means comprises vehicle indicating means associated with the vehicle; and wherein said vehicle indicating means comprises at least one of a light, a visual display, a vibration transducer, a speech message generator, and an audible signal generator.

17. A vehicle function control system according to claim 15 wherein said indicating means comprises remote indicating means remotely positioned from the vehicle; and wherein said remote indicating means comprises at least one of a light, a visual display, a vibration transducer, a speech message generator, and an audible signal generator.

18. A vehicle function control system according to claim 15 wherein said verifying means further comprises activating means for causing said indicating means to generate an indication.

19. A vehicle function control system according to claim 18 wherein said activating means comprises an ignition switch.

20. A vehicle function control system according to claim 18 wherein said activating means comprises vehicle activating means associated with the vehicle; and wherein said vehicle activating means comprises at least one of a manually operated switch, a vehicle switch, and a vehicle sensor.

21. A vehicle function control system according to claim 18 wherein said activating means comprises remote activating means remote from the vehicle.

22. A vehicle function control system according to claim 1 further comprising token code reset means for permitting the user to restore at least one previously learned unique code and remove at least one more recently learned unique code.

23. A vehicle function control system according to claim 22 wherein said token verifying means enters a warning mode and remains in the warning mode for a predetermined warning time responsive to a new uniquely coded token being learned.

24. A vehicle function control system according to claim 23 wherein learned codes designated as current are for controlling at least one vehicle function; wherein codes designated hold are changeable to current; and wherein said token code reset means comprises means for changing at least one code from current to hold responsive to learning a new uniquely coded token.

25. A vehicle function control system according to claim 24 wherein said token code reset means further comprises means for learning at least one new uniquely coded token as a temporary code which is also for controlling at least one vehicle function.

26. A vehicle function control system according to claim 25 wherein said token code reset means further comprises means for deleting hold codes, and converting temporary codes to current codes responsive to expiration of the predetermined warning time.

27. A vehicle function control system according to claim 26 wherein said token code reset means comprises means for deleting temporary codes and maintaining hold codes responsive to learning a new uniquely coded token when in the warning mode.

28. A vehicle function control system according to claim 27 wherein said token code reset means further comprises restore means for restoring hold codes to current codes, and for deleting temporary codes responsive to learning a new uniquely coded token matching a hold code and when in the warning mode.

29. A vehicle function control system according to claim 28 wherein said restore means further comprises means for exiting the warning mode.

30. A vehicle function control system responsive to at least one uniquely coded token for being carried by a user and comprising at least one first electrical conductor, the vehicle function control system comprising:

a token reader at the vehicle comprising at least one second electrical conductor for connecting to the at least one first electrical conductor of the at least one uniquely coded token and for reading the unique code therefrom; and a controller at the vehicle for controlling at least one vehicle function responsive to said token reader, said controller comprising
token learning means for learning the unique code of the at least one uniquely coded token to define at least one learned uniquely coded token for controlling the at least one vehicle function, and
token verifying means for generating an indication relating to whether a new uniquely coded token has been learned by said token learning means to thereby alert the user of a potentially unauthorized learned uniquely coded token.

31. A vehicle function control system according to claim 30 wherein the at least one uniquely coded token comprises a uniquely configured resistor matrix.

32. A vehicle function control system according to claim 30 wherein the at least one uniquely coded token comprises a uniquely coded integrated circuit.

33. A vehicle function control system according to claim 30 further comprising a vehicle ignition key; and wherein the at least one uniquely coded token is positioned in the vehicle ignition key.

34. A vehicle function control system according to claim 33 wherein said controller comprises engine enabling means for enabling operation of the vehicle engine responsive to connecting the at least one learned uniquely coded token to said token reader.

35. A vehicle function control system according to claim 30 wherein said token reader provides power to the at least one uniquely coded token when connected thereto so that the at least one uniquely coded token requires no internal power source.

36. A vehicle function control system according to claim 30 wherein said controller comprises door unlock means for unlocking at least one vehicle door responsive to connecting the at least one learned uniquely coded token to said token reader.

37. A vehicle function control system according to claim 30 wherein said token learning means is switchable between a learning mode permitting learning of the unique code of the at least one uniquely coded token, and a secure mode.

38. A vehicle function control system according to claim 37 wherein said token learning means comprises token deleting means for deleting all prior learned uniquely coded tokens based upon entering the learning mode.

39. A vehicle function control system according to claim 37 wherein said token verifying means comprises learning mode entered indicating means for indicating that the learning mode of said token learning means has been entered.

40. A vehicle function control system according to claim 37 wherein said learning mode entered indicating means comprises time lapse means for indicating when the learning mode of said token learning means has last been entered.

41. A vehicle function control system according to claim 40 wherein said time lapse means comprises means for progressively indicating a passage of time since the learning mode has last been entered.

42. A vehicle function control system according to claim 39 wherein said token verifying means comprises learned token number indicating means for indicating a number of learned tokens.

43. A vehicle function control system according to claim 39 wherein said token verifying means comprises learned token change indicating means for indicating a change in a number of learned tokens.

44. A vehicle function control system according to claim 39 wherein said token verifying means comprises indicating means for generating an indication relating to whether a new uniquely coded token has been learned by the token learning means.

45. A vehicle function control system according to claim 39 wherein said verifying means further comprises activating means for causing said indicating means to generate an indication.

46. A vehicle function control system according to claim 30 further comprising token code reset means for permitting the user to restore at least one previously learned unique code and remove at least one more recently learned unique code.

47. A vehicle function control system according to claim 46 wherein said token verifying means enters a warning mode and remains in the warning mode for a predetermined warning time responsive to a new uniquely coded token being learned.

48. A vehicle function control system according to claim 47 wherein learned codes designated as current are for controlling at least one vehicle function; wherein codes designated hold are changeable to current; and wherein said token code reset means comprises means for changing at least one code from current to hold responsive to learning a new uniquely coded token.

49. A vehicle function control system according to claim 48 wherein said token code reset means further comprises means for learning at least one new uniquely coded token as a temporary code which is also for controlling at least one vehicle function.

50. A vehicle function control system according to claim 49 wherein said token code reset means further comprises means for deleting hold codes, and converting temporary codes to current codes responsive to expiration of the predetermined warning time.

51. A vehicle function control system according to claim 50 wherein said token code reset means comprises means for deleting temporary codes and maintaining hold codes responsive to learning a new uniquely coded token when in the warning mode.

52. A vehicle function control system according to claim 51 wherein said token code reset means further comprises restore means for restoring hold codes to current codes, and for deleting temporary codes responsive to learning a new uniquely coded token matching a hold code and when in the warning mode.

53. A vehicle function control system according to claim 52 wherein said restore means further comprises means for exiting the warning mode.

54. A vehicle function control system responsive to at least on uniquely coded token for being carried by a user and comprising at least one first electrical conductor, the vehicle function control system comprising:

a token reader at the vehicle comprising at least one second electrical conductor for connecting to the at least one first electrical conductor of the at least one uniquely coded token and for reading the unique code therefrom; and a controller at the vehicle for controlling at least one vehicle function responsive to said token reader, said controller comprising
token learning means for learning the unique code of the at least one uniquely coded token to define at least one learned uniquely coded token for controlling the at least one vehicle function, and
token verifying means for generating an indication relating to whether a new uniquely coded token has been learned by said token learning means to thereby alert the user of a potentially unauthorized learned token, and
token code reset means for permitting the user to restore at least one previously learned unique code and remove at least one more recently learned unique code.

55. A vehicle function control system according to claim 54 wherein the at least one uniquely coded token comprises a uniquely configured resistor matrix.

56. A vehicle function control system according to claim 54 wherein the at least one uniquely coded token comprises a uniquely coded integrated circuit.

57. A vehicle function control system according to claim 54 further comprising a vehicle ignition key; and wherein the at least one uniquely coded token is positioned in the vehicle ignition key.

58. A vehicle function control system according to claim 57 wherein said controller comprises engine enabling means for enabling operation of the vehicle engine responsive to connecting the at least one learned uniquely coded token to said token reader.

59. A vehicle function control system according to claim 54 wherein said token reader provides power to the at least one uniquely coded token when connected thereto so that the at least one uniquely coded token requires no internal power source.

60. A vehicle function control system according to claim 54 wherein said token verifying means enters a warning mode and remains in the warning mode for a predetermined warning time responsive to a new uniquely coded token being learned.

61. A vehicle function control system according to claim 60 wherein learned codes designated as current are for controlling at least one vehicle function; wherein codes designated hold are changeable to current; and wherein said token code reset means comprises means for changing at least one code from current to hold responsive to learning a new uniquely coded token.

62. A vehicle function control system according to claim 61 wherein said token code reset means further comprises means for learning at least one new uniquely coded token as a temporary code which is also capable of controlling at least one vehicle function.

63. A vehicle function control system according to claim 62 wherein said token code reset means further comprises means for deleting hold codes, and converting temporary codes to current codes responsive to expiration of the predetermined warning time.

64. A vehicle function control system according to claim 63 wherein said token code reset means comprises means for deleting temporary codes and maintaining hold codes responsive to learning a new uniquely coded token when in the warning mode.

65. A vehicle function control system according to claim 64 wherein said token code reset means further comprises restore means for restoring hold codes to current codes, and for deleting temporary codes responsive to learning a new uniquely coded token matching a hold code and when in the warning mode.

66. A vehicle function control system according to claim 65 wherein said restore means further comprises means for exiting the warning mode.

67. A vehicle function control system responsive to at least one uniquely coded token for being carried by a user and comprising at least one first electrical conductor, the vehicle function control system comprising:

a token reader at the vehicle comprising at least one second electrical conductor for connecting to the at least one first electrical conductor of the at least one uniquely coded token and for reading the unique code therefrom; and a controller at the vehicle for controlling at least one vehicle function responsive to said token reader, said controller for learning the unique code of the at least one uniquely coded token to define at least one learned uniquely coded token for controlling the at least one vehicle function, and generating an indication of a number of learned tokens.

68. A vehicle function control system according to claim 67 wherein the at least one uniquely coded token comprises a uniquely configured resistor matrix.

69. A vehicle function control system according to claim 67 wherein the at least one uniquely coded token comprises a uniquely coded integrated circuit.

70. A vehicle function control system according to claim 67 wherein said controller enables operation of the vehicle engine responsive to connecting the at least one learned uniquely coded token to said token reader.

71. A vehicle function control system according to claim 67 wherein said token reader provides power to the at least one uniquely coded token when connected thereto so that the at least one uniquely coded token requires no internal power source.

72. A vehicle function control system according to claim 67 wherein said controller is for unlocking at least one vehicle door responsive to connecting the at least one learned uniquely coded token to said token reader.

73. A method for controlling at least on vehicle function using at least one uniquely coded token for being carried by a user and comprising at least one first electrical conductor, the method comprising:

reading the unique code from the at least one uniquely coded token at the vehicle via the at least one first electrical conductor;

providing a controller at the vehicle for controlling at least one vehicle function responsive to reading the at least one uniquely coded token;

learning the unique code of the at least one uniquely coded token into the controller to define a learned uniquely coded token for controlling the at least one vehicle function; and generating an indication relating to whether a new uniquely coded token has been learned into the controller to thereby alert the user of a potentially unauthorized uniquely coded token for controlling the at least one vehicle.

74. A method according to claim 73 wherein the at least one uniquely coded token comprises a uniquely configured resistor matrix.

75. A method according to claim 73 wherein the at least one uniquely coded token comprises a uniquely coded integrated circuit.

76. A method according to claim 73 wherein the at least one uniquely coded token is positioned in a vehicle ignition key.

77. A method according to claim 73 further comprising enabling operation of the vehicle engine responsive to connecting the learned uniquely coded token to the token reader.

78. A method according to claim 73 further comprising unlocking at least one vehicle door responsive to connecting the learned uniquely coded token to the token reader.

79. A method according to claim 73 further comprising deleting all prior learned uniquely coded tokens based upon entering the learning mode of the controller.

80. A method according to claim 73 further comprising indicating that the learning mode has been entered.

81. A method according to claim 73 wherein the verifying comprises indicating a number of learned uniquely coded tokens.

82. A method according to claim 73 wherein the verifying comprises indicating a change in a number of learned uniquely coded tokens.

83. A method according to claim 73 wherein the verifying comprises generating an indication relating to whether a new uniquely coded token has been learned.

84. A method for controlling at least on vehicle function using at least one uniquely coded token for being carried by a user and comprising at least one first electrical conductor, the method comprising:

reading the unique code from the at least one uniquely coded token at the vehicle via the at least one first electrical conductor;

providing a controller at the vehicle for controlling at least one vehicle function responsive to reading the at least one uniquely coded token;

learning the unique code of the at least one uniquely coded token into the controller to define a learned uniquely coded token for controlling the at least one vehicle function; and generating an indication of a number of learned uniquely coded tokens learned into the controller to thereby alert the user of a potentially unauthorized uniquely coded token.

85. A method according to claim 84 wherein the at least one uniquely coded token comprises a uniquely configured resistor matrix.

86. A method according to claim 84 wherein the at least one uniquely coded token comprises a uniquely coded integrated circuit.

* * * * *

UNITED STATES PATENT AND TRADEMARK OFFICE
CERTIFICATE OF CORRECTION

PATENT NO. : 6,480,117 B1
DATED : November 12, 2002
INVENTOR(S) : Kenneth E. Flick It is certified that error appears in the above-identified patent and that said Letters Patent is hereby corrected as shown below:

Column 1,
Lines 10-13, delete "U.S. patent application No. 08/622,515, filed Mar. 25, 1996, now U.S. Pat. No. 6,140,938 which, in turn, is a continuation-in-part Ser. No. 08/423,570 filed Apr. 14, 1995 of U.S. Pat. No. 5,654,688." insert
-- U.S. patent application Ser. No. 08/622,515, filed Mar. 25, 1996, now U.S. Pat. No. 6,140,938 which, in turn, is a continuation-in-part of U.S. patent application Ser. No. 08/423,570 filed Apr. 14, 1995 now U.S. Pat. No. 5,654,688. --

Column 8,
Line 29, delete "witching" insert -- switching --

Column 9,
Line 53, delete "gain" insert -- Again --

Column 11,
Line 37, delete "less that" insert -- less than --

Column 12,
Line 39, delete "FIG." insert -- FIG. 10 --

Column 13,
Line 6, delete "current code operate" insert -- current codes operate --

Column 14,
Line 22, delete "coded" insert -- coded token --

Column 18,
Line 5, delete "on" insert -- one --

Column 19,
Line 54, delete "on" insert -- one --

UNITED STATES PATENT AND TRADEMARK OFFICE
CERTIFICATE OF CORRECTION

PATENT NO.    : 6,480,117 B1
DATED         : November 12, 2002
INVENTOR(S)   : Kenneth E. Flick It is certified that error appears in the above-identified patent and that said Letters Patent is hereby corrected as shown below:

Column 20,
Line 39, delete "on" insert -- one --

Signed and Sealed this

Eleventh Day of March, 2003

JAMES E. ROGAN
*Director of the United States Patent and Trademark Office*